J. J. PICKERING.
WATER WEIGHING MACHINE.
APPLICATION FILED MAY 25, 1920.
1,435,494.
Patented Nov. 14, 1922.
3 SHEETS—SHEET 2.
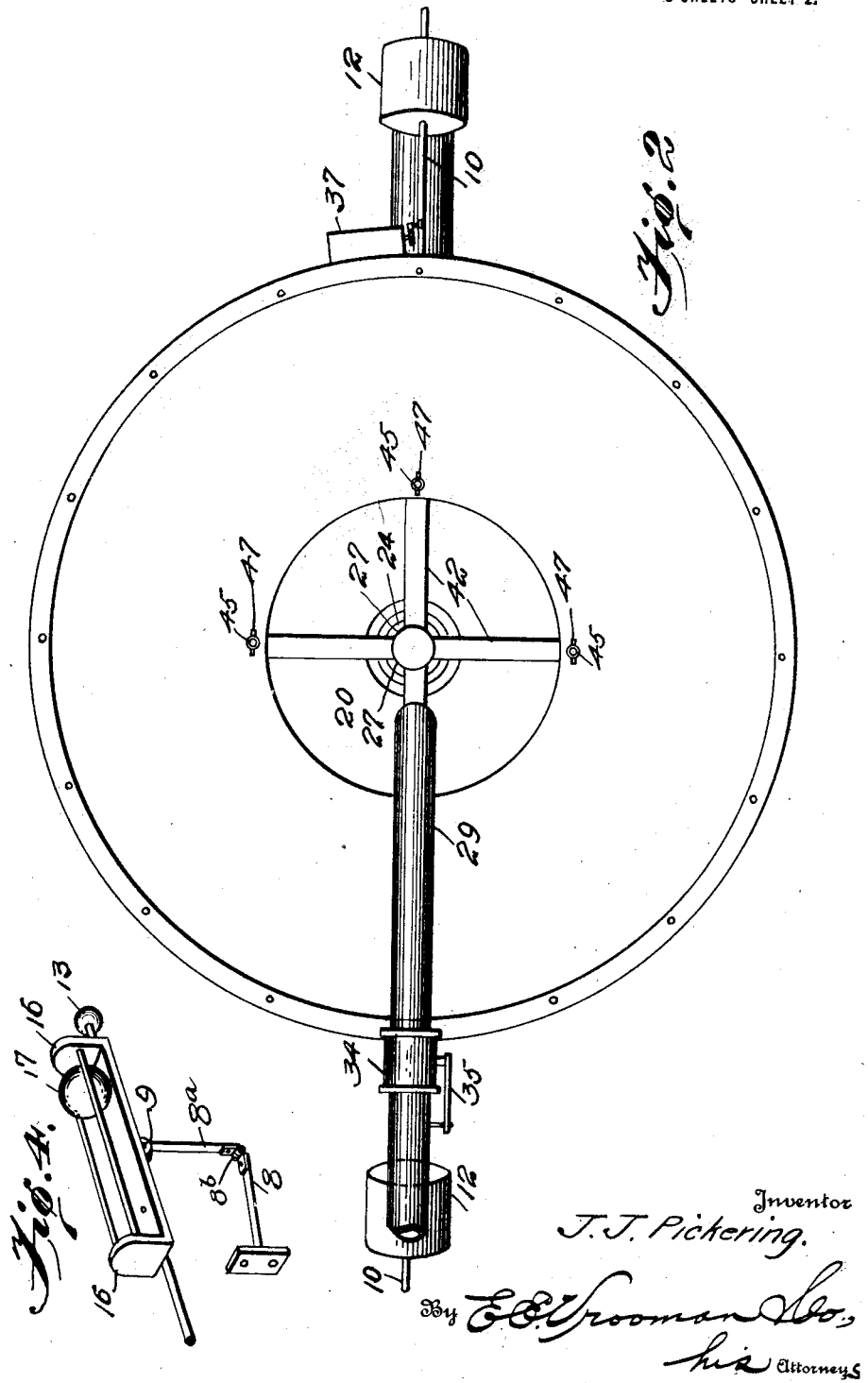
Inventor
J. J. Pickering.

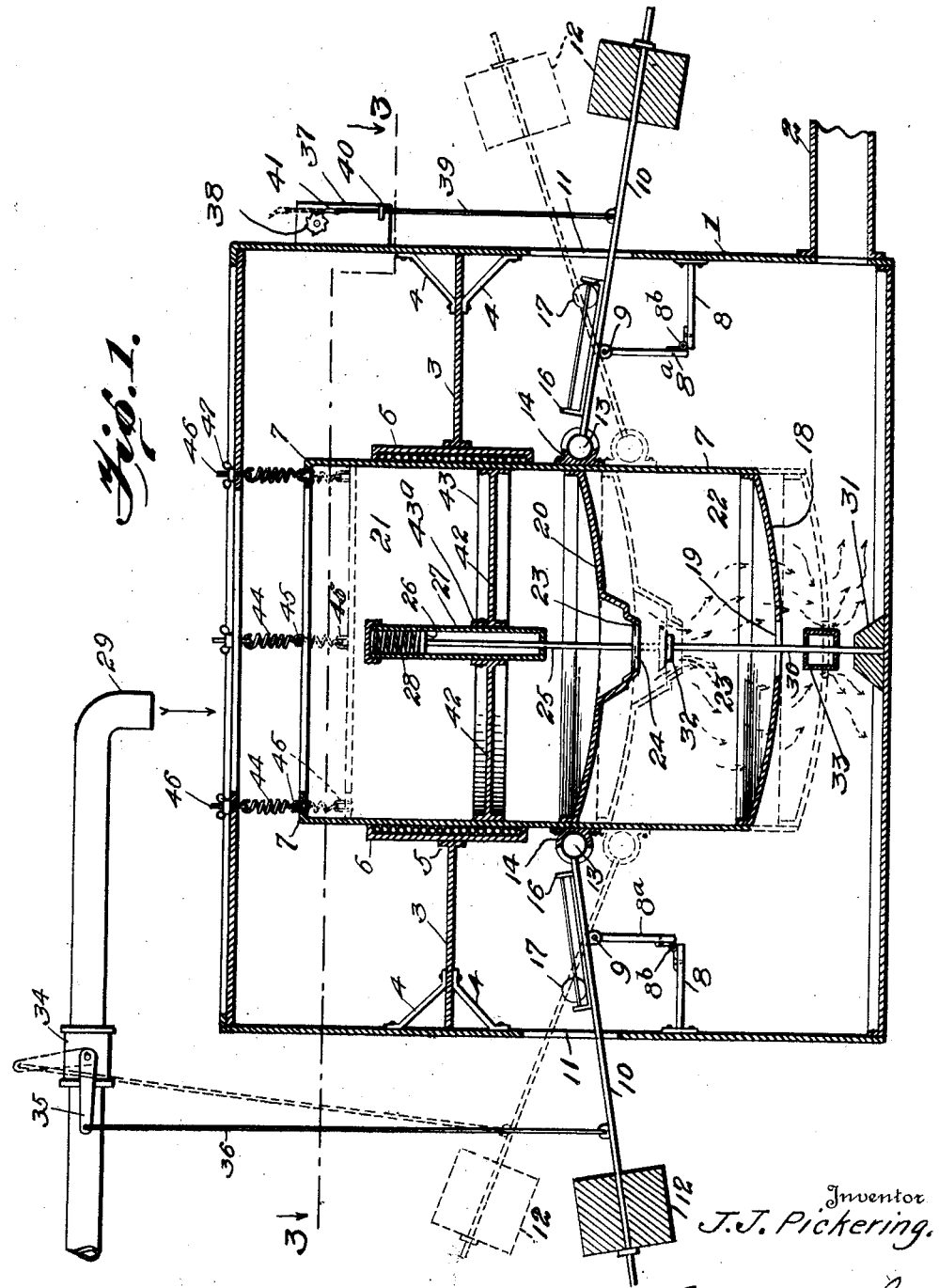

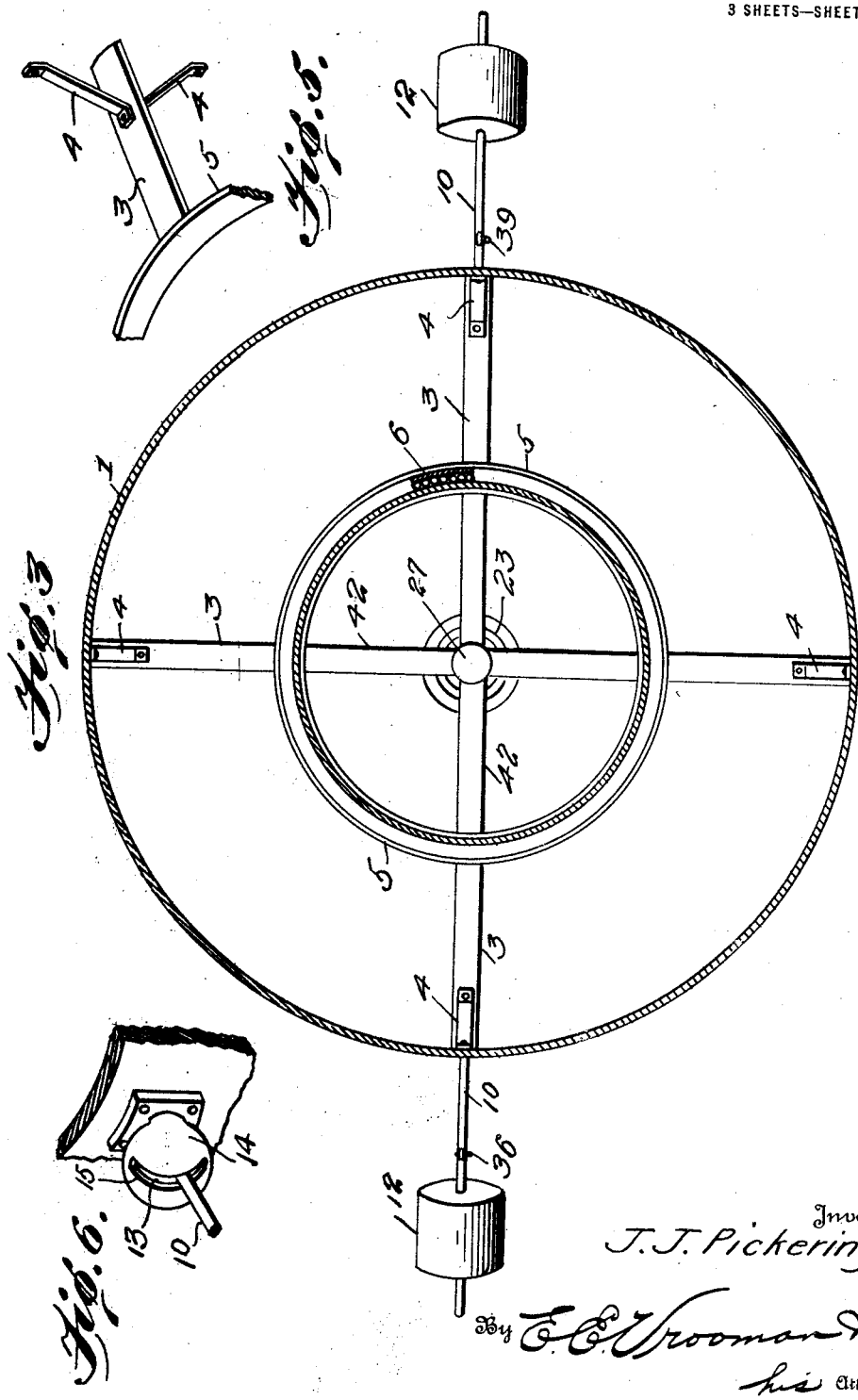

Patented Nov. 14, 1922.

1,435,494

UNITED STATES PATENT OFFICE.

JOHN J. PICKERING, OF PIQUA, OHIO.

WATER-WEIGHING MACHINE.

Application filed May 25, 1920. Serial No. 384,234.

*To all whom it may concern:*

Be it known that I, JOHN J. PICKERING, a citizen of the United States, residing at Piqua, in the county of Miami and State of Ohio, have invented certain new and useful Improvements in Water-Weighing Machines, of which the following is a specification, reference being had therein to the accompanying drawings.

This invention relates to a water weighing machine, and has for its object the construction of a comparatively simple and efficient machine for the weighing or measuring of liquid, preferably water.

Another object of the invention is the construction of a machine that will weigh or measure water, and when the machine has received a certain quantity of water, it will act to close the inlet supply pipe, while the water is being discharged from the machine.

With these and other objects in view, my invention comprises certain novel combination, constructions and arrangements of parts as will be hereinafter described, illustrated in the accompanying drawings, and more particularly pointed out in the appended claims.

In the drawings:

Figure 1 is a longitudinal sectional view of a machine constructed in accordance with the present invention, while Figure 2 is a top plan view of the same.

Figure 3 is a sectional view taken on line 3—3, Fig. 1, and looking in the direction of the arrows.

Figure 4 is a perspective view of one of the ball racks.

Figure 5 is a fragmentary perspective view of one of the bracket arms, showing brackets attached thereto.

Figure 6 is a fragmentary perspective view of the machine, showing particularly the casing for the inner end of the lever arms.

Referring to the drawings by numerals, 1 designates the tank, to which is secured the outlet pipe 2. Bracket arms 3 are secured to the sides of the tank 1, by means of brackets 4. The outer ends of the arms 3 are connected by an annular band 5, which band 5 supports ball-containing casings 6; in these casings 6 are balls, constituting ball-bearings for facilitating the vertical movement of the movable receptacle or bucket 7.

Brackets 8 are secured, at their outer ends, to the inner face of the tank 1. Arms $8^a$ are hingedly fastened, at $8^b$, to brackets 8, and pivotally connected, at 9, to arms $8^a$, are lever arms 10. The lever arms 10 extend through slots 11, formed in the sides of the tank 1, and near the outer ends of arms 10 are positioned weights 12. The inner ends of arms 10 are provided with fixed balls 13, and these balls 13 are positioned in the slotted casings 14 attached to the sides of the bucket 7 below the ball-containing casings 6, Fig. 1. The lever arms 10 are free to travel in the slot 15 of the casings 14. On each lever arm 10, within the tank 1, is secured a ball rack 16, in which rack travels the weight ball 17; it is to be noted that this rack 16 is placed directly over the pivot 9, of arm 10, to facilitate the operation of the machine, as hereinafter explained.

The movable receptacle or bucket 7 is provided with a bottom 18 that has a central opening 19. An intermediate bottom 20 is secured within the bucket 7, which intermediate bottom 20 divides the bucket into an upper compartment 21 and a lower compartment 22. The bottom 20 is provided with an opening, at 23, and this opening is normally closed by vertically movable valve 24. A stem 25 is attached, at its lower end, to valve 24 and its upper end is provided with a head 26, which head is slidably mounted within the spring-containing casing 27; between the upper end of the casing 27 and the head 26 is a coil spring 28. The spring 28 normally retains the valve 24 in its closed seated position upon the bottom 21, closing the upper compartment 21, and allowing water discharged from the inlet pipe 29 to fill the compartment 21 to the desired or predetermined amount. A standard 30 is secured to the base 31, which base is secured to the bottom of the tank 1. To the upper end of standard 30 is fastened a cap 32 that is adapted to be engaged by the valve 24, so that when the bucket 7 moves downwardly, the valve 24 will be raised, as shown by the dotted lines in Fig. 1, permitting the water to flow out of the upper compartment 21 into the lower compartment 22. A stopper 33 is fastened to the standard 30 and partly fills the opening 19 of the bottom 18 to prevent water from rushing or passing too quickly out of compartment 22, thereby preventing the weights 12 and 17 from causing the bucket 7 to return too quickly or suddenly to its normal position for refilling; the discharging of the water from compartment 21 into compartment 22 is gradual so that the returning of the bucket to its set or empty position, for refilling, is done, not suddenly but gradually, for preventing injury to the mechanism. In the valve casing 34, of the inlet pipe 29, a suitable valve is positioned, operated by arm 35, which arm 35 is connected by link 36 to one of the lever arms 10; consequently, when the arms 10 are in the position shown in full lines in Fig. 1, water will be flowing into the upper compartment 21 of the bucket 7, but as the compartment fills, the weight of the water will cause the bucket to begin to move downwardly and as the bucket is completely filled, the valve in casing 34 will be closed, whereby no water is flowing through pipe 29, when the bucket is in its lowest position, shown by dotted lines in Fig. 1, during the emptying period of the machine. Upon the receptacle or bucket 7 being emptied, the weights 12 will move downwardly, and as soon as the arms 10 cause the outer ends of the ball racks 16 to be slightly inclined, then the weight balls 17 will roll to the outer ends of their racks more quickly, returning the bucket 7 to its normal position to be refilled, without any jar or injury to the mechanism.

On the side of the tank 1, I place casing 37, in which a recording mechanism is positioned, and the ratchet wheel 38 is connected to the mechanism in casing 37, and vertically movable link 39 is pivotally fastened, at its lower end, to an arm 10, Fig. 1, and the link 39 is slidably mounted in an eye 40 on the side of the casing 37, and pivotally connected to the upper end of the link 39 is a dog or pawl 41 that engages and operates the ratchet wheel 38, so that upon each upward movement of the arm 10, after receptacle 7 has been emptied, the ratchet wheel 38 will be operated, causing the recorder to record the amount of liquid or water, passing through the machine.

It will be understood that the spring-containing casing 27 is retained in the middle of compartment 21, by means of arms 42; these arms are attached, at their inner ends 43ª, to the sides of the casing 27, and the outer ends are attached to a band 43, which band is fastened to the inner face of the bucket 7.

Coil springs 44 are attached, at their lower ends, at 45, to the upper edge of the bucket 7, and their upper ends are attached to bolts 46, which bolts extend through portions of the top of the tank 1; butterfly nuts 47 are positioned on the bolts 46 for adjusting the the tension of the springs 44. By measuring the liquid placed in the compartment 21, through the medium, say of a hand measure, such as a quart or gallon measure, or by manually weighing the liquid, before it is placed in the compartment 21 and adjusting the tension of springs 44, the machine can be set for "weighing" or measuring the exact quantity of liquid that will be automatically handled and recorded as passing through it, upon the operator starting the machine, by permitting it to automatically operate through the flowing, into the compartment 21, through the inlet pipe 29, of water or other liquid.

I wish it to be understood that I use the term "bucket" in a generic sense, meaning a receptacle or container.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a machine of the class described, the combination with a tank, of arms provided with ball-containing casings positioned in said tank, a bucket engaging said ball-containing casings and movably mounted between the same, said bucket provided with valved means, and means carried by the tank for returning the bucket to its normal position after the valved means has been operated for permitting the bucket to be emptied.

2. In a machine of the class described, the combination with a tank, of a bucket in said tank, coil springs connected at their lower ends to said bucket, bolt and nut means connecting the upper ends of the springs to the top of said tank, said bucket provided with valved means, and weighted means connected to the sides of the bucket for moving the bucket in one direction within the tank.

3. In a machine of the class described, the combination with a tank, of a bucket movably mounted within said tank, said bucket provided with a partly open bottom and with a valve-closed intermediate bottom, and means extending through the partly open bottom of the bucket and adapted to engage the valve-closed intermediate bottom for permitting the bucket to be emptied when it moves to its lowest position within the tank.

4. In a machine of the class described, the combination with a tank, of a movable bucket within said tank, said bucket provided with a partly closed lower bottom and with an intermediate bottom, said intermediate bottom provided with a valve, a valve stem secured to said valve, a spring-containing casing in said bucket, said stem working in said casing, and normally retaining the valve in a seated position through the action of the spring in the casing, a standard within the tank and extending through the partly open lower bottom, and said standard provided with means for engaging the valve of the intermediate bottom for opening the same for permitting liquid to be discharged from the bucket when the bucket has travelled to its lowest position within the tank.

5. In a machine of the class described, the combination with a tank, of a bucket adapted to move in said tank, said bucket provided with slotted casings upon its sides, brackets secured to the tank contiguous to said slotted casings, lever arms and means pivotally mounting said lever arms upon said brackets, said lever arms extending through the sides of said tank and having their inner ends movably mounted in the slotted casings, ball racks secured directly above the pivot of said lever arms, weight balls freely mounted in and adapted to travel the length of said racks, and weights carried by the lever arms near their outer ends.

6. In a machine of the class described, the combination with a tank, of a vertically movable bucket in said tank, tensioning springs connected to the tank and to the bucket, said bucket provided with a lower bottom having a central opening, said bucket provided with an intermediate bottom having a central opening, a spring-pressed valve closing the central opening of the intermediate bottom, a standard secured at its lower end to the tank and extending through the central opening of the lower bottom and positioned in the path of movement of the valve of the intermediate bottom when the bucket moves downwardly within the tank, whereby the valve of the intermediate bottom is raised for permitting the upper compartment of the bucket to be emptied, and a stopper on the standard and adapted to move into the central opening of the lower bottom, for partly closing the same when the bucket moves to its lowest position within the tank.

In testimony whereof I hereunto affix my signature.

JOHN J. PICKERING.